United States Patent [19]

Kashio

[11] 4,149,619

[45] Apr. 17, 1979

[54] TABULATION CONTROL SYSTEMS FOR PRINTING APPARATUS

[75] Inventor: Toshio Kashio, Tokyo, Japan

[73] Assignee: Casio Computer Co., Ltd., Higashiyamato, Japan

[21] Appl. No.: 492,135

[22] Filed: Jul. 26, 1974

Related U.S. Application Data

[63] Continuation-in-part of Ser. No. 288,102, Sep. 11, 1972, abandoned.

[30] Foreign Application Priority Data

Sep. 14, 1971 [JP] Japan ................................ 46-71349

[51] Int. Cl.² ...................... B41J 25/00; G06K 15/00
[52] U.S. Cl. ................................................ 400/279
[58] Field of Search ........................... 197/176–178; 340/172.5; 234/13

[56] References Cited

U.S. PATENT DOCUMENTS

| | | | |
|---|---|---|---|
| 2,739,690 | 3/1956 | Blodgett | 197/176 |
| 2,818,961 | 1/1958 | Toeppen | 197/176 |
| 3,091,387 | 5/1963 | Locke | 234/13 |
| 3,286,237 | 11/1966 | Kikuchi | 340/172.5 |
| 3,519,118 | 7/1970 | Reszka | 197/176 |
| 3,646,268 | 2/1972 | Ricciardi et al. | 197/176 X |
| 3,749,223 | 7/1973 | Guzak, Jr. | 197/176 |
| 3,854,566 | 12/1974 | Ellis | 197/176 |

FOREIGN PATENT DOCUMENTS 2153996  4/1973  France ...................................... 197/176

OTHER PUBLICATIONS

IBM Technical Disclosure Bulletin, vol. 13, No. 8, 1-71, pp. 2141-2142.
IBM Technical Disclosure Bulletin, vol. 13, No. 8, 3-71, pp. 3182-3184.

Primary Examiner—Paul E. Shapiro
Attorney, Agent, or Firm—Irving M. Weiner; Pamela S. Austin; Melvin Yedlin

[57] ABSTRACT

A tabulation control system including a tab position memory shift register for memorizing tab-set position signals representing summed up values from the first position in a range in which tab setting operations are possible. A buffer register is connected to receive tab-set position signals in response to shift signals according to tab commands, a printing head position counter for counting the total and number of shifts of a printing head from the first position is provided. Also provided is coincidence detector which compares the output from the buffer register with the output of the counter and stops the printing head when these outputs coincide with each other.

2 Claims, 7 Drawing Figures

FIG. 2
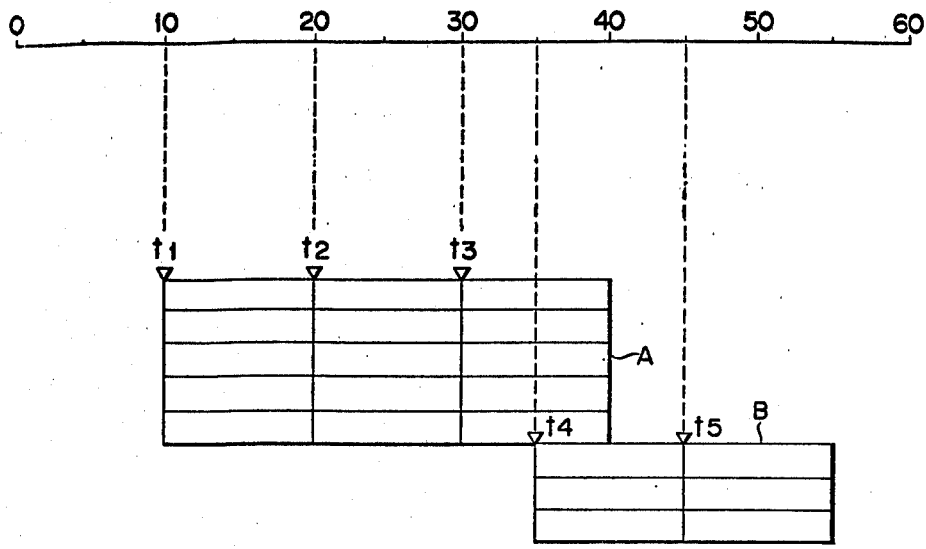
FIG. 3
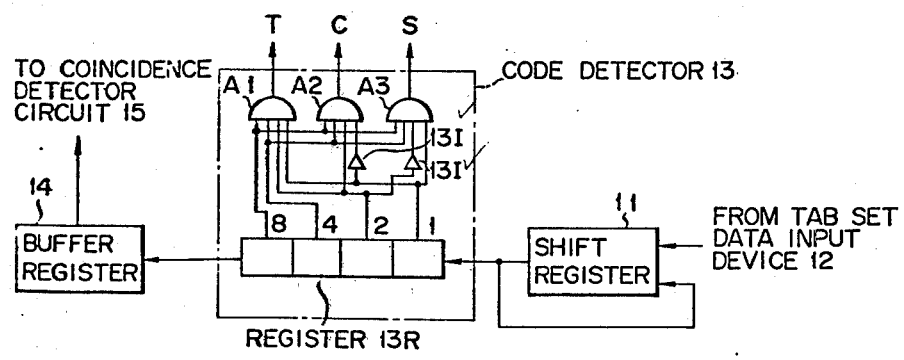
FIG. 4
|   | 8 | 4 | 2 | 1 | WEIGHT |
|---|---|---|---|---|---|
| T | 1 | 1 | 1 | 1 | |
| C | 1 | 1 | 1 | 0 | |
| S | 1 | 1 | 0 | 1 | |

|    | A | B | CLOCK PULSE(P) |
|----|---|---|---|
| T0 | 0 | 0 | RP |
| T1 | 0 | 1 | 1 |
| T2 | 1 | 0 | 1 |
| T3 | 1 | 1 | 1 |
| T0 | 0 | 0 | 1 |

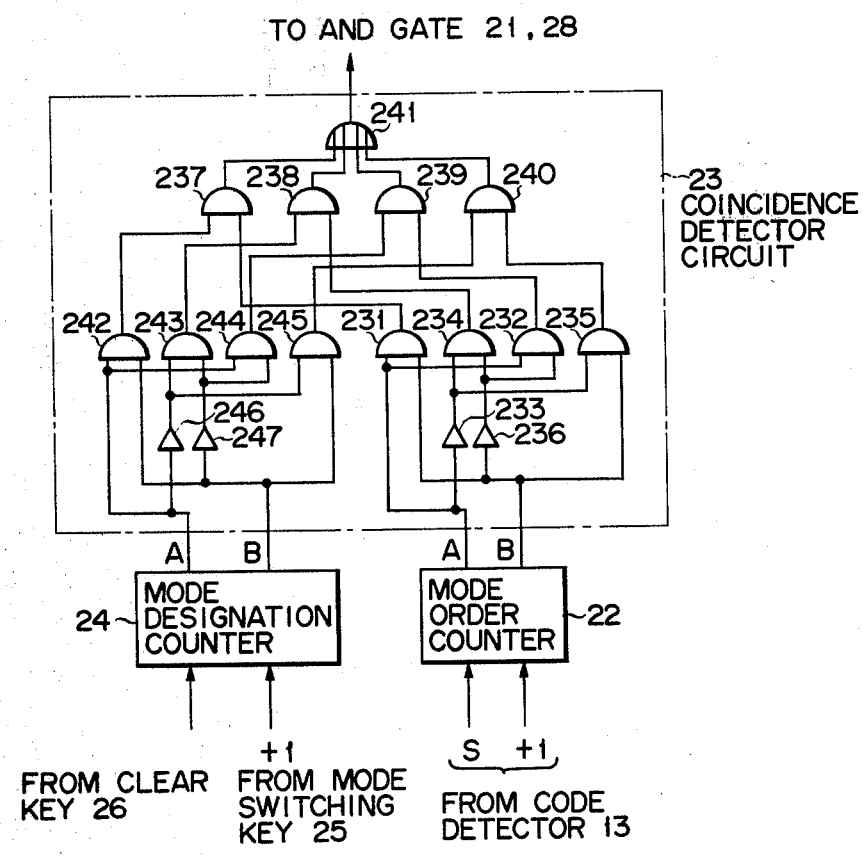

4,149,619

TABULATION CONTROL SYSTEMS FOR PRINTING APPARATUS

CROSS REFERENCE TO RELATED APPLICATION

This is a continuation-in-part of application Ser. No. 288,102, filed Sept. 11, 1972, now abandoned.

BACKGROUND OF THE INVENTION

1. Field of the Invention

This invention relates to a tabulation control system for printing apparatus for use in a tabulation system utilizing a computer or the like wherein the printing control can be smoothyl effected.

2. Description of Prior Art

Computers or the like are now extensively used in tabulation systems wherein the output from the computer is used to drive a printing mechanism so as to print and record selected information at designated positions of a book. In such an application it is necessary to drive the printing mechanism in accordance with the designated position of the book in which the information is to be printed.

For this reason, in such a printing apparatus it is necessary to provide a tab-set control which designates the printing starting position in accordance with the frame and column of the book and to design the book so as to ensure positive tab-set control. However, to perform an efficient tabulation, it is desirable to record many types of classified information on one page of a book or a single slip. Increasing the types of information to be recorded in the book renders it difficult to accurately control the tab-set. Also, if it is necessary to design the book such that a tab-set position of one column will not be included in the other vacant columns of the book, the design of the tabulation system will be greatly complicated.

Accordingly, it is an object of the present invention to provide an improved tabulation control system for printing apparatus which simplifies the design of the tabulation system as well as the operation of the tab-set control.

SUMMARY OF THE INVENTION

In accordance with the present invention, there is provided a tabulation control system of printing apparatus including a tab position memory register for memorizing a plurality of tab-set positions in terms of encoded decimal values, printing head feed means operated by a pulse. Also provided is a printing head position counter for counting the number of pulses supplied to the printing head feed means, means for shifting the content of the tab position memory register to produce a signal of the next position in terms of a decimal value each time a tab-set operation is made, and a coincidence detector responsive to the signal of the next tab position and the output from the printing head position counter for controlling the operation of the printing head feed means.

The invention can be more fully understood from the following description taken in conjunction with the accompanying drawings.

BRIEF DESCRIPTION OF THE DRAWINGS

FIG. 2 is a diagram showing one example of a book for explaining the operation of the tabulation control system embodying the invention.

FIG. 3 is a block diagram showing one detailed circuit of the code detector 13 of FIG. 1.

FIG. 4 is a signal code table for explaining the operation of the code detector of FIG. 3.

FIG. 7 is a block diagram showing one embodiment of the coincidence detector circuit 23 of FIG. 1.

DETAILED DESCRIPTION

Figure 1:
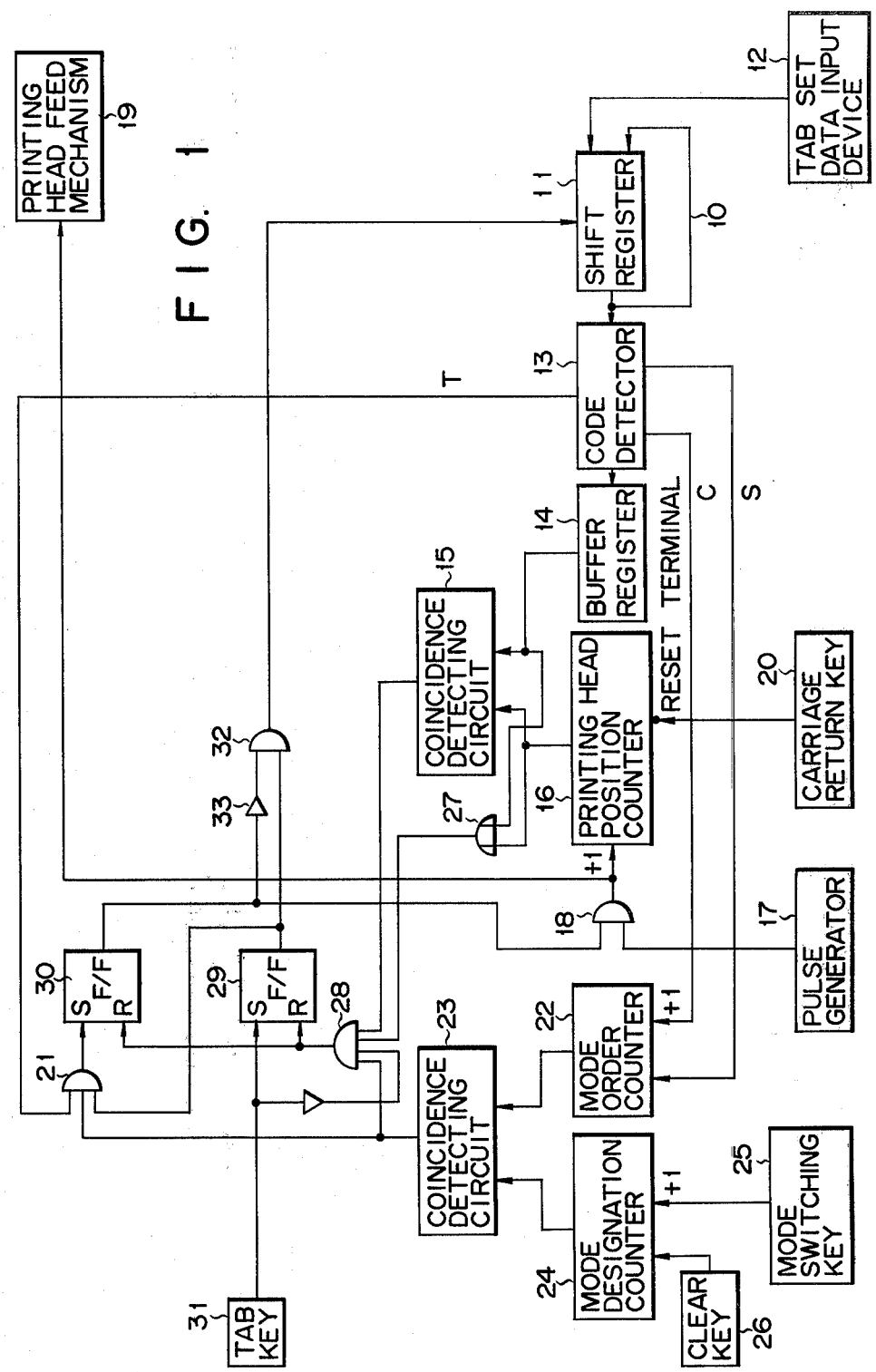
FIG. 1 is a block diagram showing one embodiment of a tabulation control system for a printing apparatus embodying the invention.

Referring now to the accompanying drawings, a preferred embodiment shown in FIG. 1 comprises a tab position memory register 11 including a static shift register provided with a feedback path 10, and a tab-set data input device 12 connected to supply data to the tab position memory register 11 for storing the data therein. The data signal which is caused to overflow from register 11 by means of a signal corresponding to a tab command signal contains the codes of tab-set signal T, start signals S and mode switching signal C and tab position data, and these codes and data are detected by a code detector 13. The code detector 13, for example, comprises, as shown in FIG. 3, a four-bit register 13R and a logic circuit consisting of AND gates A1, A2 and A3 connected to each bit memory of the register 13R and inverters 13I connected to the register 13R bit memories corresponding to the lower two digits. The output of the register 13R bit memory corresponding to the most significant digit is connected to a buffer register 14. The codes of the signals T, C and S are represented, for example, by four-bit codes 1111, 1110 and 1101, respectively, as shown in FIG. 4, other than the codes corresponding to numerals 0–9. For example, when the contents of the four bit memories of the register 13R are all "1", the gate of the AND gate A1 is opened to produce a signal T. The tab position data are sent to a buffer register 14 from the code detector 13 in the form of decimal values representing the tab positions which correspond to the summed up positions from the first position in a range in which tab setting of the printing apparatus is possible. The values stored in the buffer register 14 are applied to a first coincidence detecting circuit 15 in which the values are compared with the output from a printing head position counter 16 which counts, in terms of decimal values, a total number of shifts of the printing head of the printing apparatus from the first position. The printing head position counter 16 is connected to receive and count the pulse signal from a pulse generator 17 through an AND circuit 18, thereby counting the total number of shifts of the printing head which corresponds to the number of driving pulse signals simultaneously sent to a printing head feed mechanism 19. Feed mechanism of this type are described in detail in applicant's co-pending United States Patent Application Ser. No. 11,486 entitled "A SYSTEM FOR ADVANCING A WRITING HEAD FOR PRINTER" filed Feb. 16, 1970, and also in U.S. Pat. No. 3,555,558, as well as in United States Patent Application Ser. No. 247,215 filed by the present applicant. The counter 16 is cleared in response to an output from a carriage return key 20.

The tab-set signal T detected by the code detector 13 is applied to an AND circuit 21; the mode switching signal C is applied to a mode order counter 22 as a counting signal; and the start signal S is applied to the mode order counter 22 as a reset signal. The mode order counter 22 is comprised of a four scale counter as shown, for example, in FIG. 5. The four scale counter 22 has two flip-flops FFA and FFB. A mode switching signal C from the code detector 13 is applied as a clock pulse (P) to an input terminal 22c and a start signal S is applied as a reset pulse (RP) to an input terminal 22S. In an initial state (T0) of the counter 22, the reset pulse (RP) is supplied to the terminal 22S and then through OR gates 221 and 222 to the reset terminals of the flip-flops FFB and FFA, respectively. At this time, the outputs A and B of the flip-flops FFA and FFB, respectively, are both "0" and the outputs (A, B) of the counter 22 show the initial state T0.

Figures 5, 6:
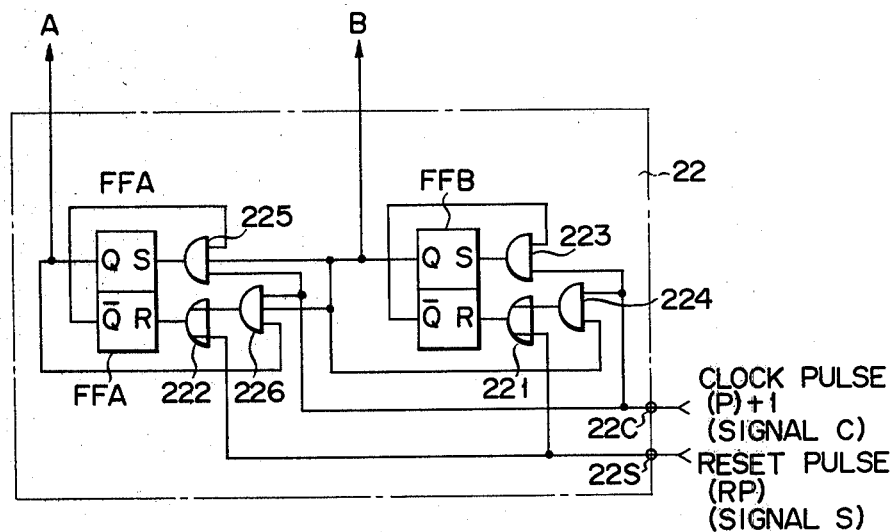
FIG. 5 is a block diagram showing a detailed circuit of the mode order counter 22 or mode designation counter 24 of FIG. 1.
FIG. 6 is a signal code table for explaining the operation of the counter of FIG. 5.

When at this state a mode switching signal C is supplied to the input terminal 22C, an AND gate 223 is opened and the signal C is delivered to the set terminal of the flip-flop FFB to cause FFB to be set. In a first state T1, as shown in FIG. 6, the output A of the flip-flop FFA remains "0" and the output B of the flip-flop FFB is "1". This represents a first mode. Next, when a second mode switching signal C is applied to the input terminal 22C, an AND gate 224 is opened and the signal C is inputted to the reset terminal of the flip-flop FFB through the OR gate 221 to produce an output B corresponding to "0". Simultaneously therewith, an AND gate 225 is opened to cause the flip-flop FFA to be set, thereby producing an output A corresponding to "1". The second state T2 represents a second mode. When a third signal C is applied to the input terminal 22C, the flip-flop FFA remains unchanged and the output A thereof is "1", while the flip-flop FFB is set to produce an output B corresponding to "1". This represents a third mode.

The mode order counter 22 is thus constructed as described above. Likewise, the printing head position counter 16 can be constructed by increasing the number of stages including such flip-flop. A mode designation counter 24 described in detail hereinafter may also be constructed in a similar way. The output from the mode order counter 22 is applied to one input of a second coincidence detecting circuit 23 to be compared with the output from the mode designation counter 24 which is applied to the other input of the coincidence detecting circuit 23. The coincidence detector circuit 23 may be constructed as shown for example, in FIG. 7. The output A of the mode order counter 22 is supplied to one input terminal of AND gates 231 and 232 and through an inverter 233 to one input terminal of AND gates 234 and 235, while the output B of the mode order counter 22 is supplied to the other input terminal of the AND gates 231 and 235 and through an inverter 236 to the other input terminal of the AND gates 232 and 234. The outputs of the AND gates 231, 234, 232 and 235 are delivered to one input terminal of AND gates 237, 238, 239 and 240, respectively. The output terminal of the AND gates 237–240 is connected through an OR gate 241 to AND gates 21 and 28. Likewise, the outputs A and B of the mode designation counter 24 constructed in the same arrangement as the mode order counter 22 are supplied, through AND gates 242–245 and inverters 246 and 247 connected in a manner shown in FIG. 7, to the other input of the AND gates 237–240.

If, for example, the outputs A and B of the mode order counter 22 are "1" and "0", respectively, and the outputs A and B of the mode designation counter 24 are "1" and "0", respectively, then, an output appears from the AND gates 232 and 244. The AND gate 239 is opened by the outputs of the AND gates 232 and 244 and the output of the AND gate 239 is delivered through the OR gate 241 to the AND gates 21 and 28. Likewise, when the outputs A, B of the counters 22 and 24 are "1" and "1", respectively, the AND gate 237 is opened; when "0" and "1", respectively, the AND gate 240 is opened; and when "0" and "0", the AND gate 238 is opened. Consequently, the corresponding detection output is obtained. The coincidence detector circuit 15 can be constructed in the same arrangement as the circuit 23. The purpose of the mode designation counter 24 is to count the number of the mode designation inputs supplied from a mode switching key 25, and it is reset by a "clear" signal from a clear key 26.

The outputs from the buffer register 14 and the printing head position counter 16 are supplied to the inputs of an AND circuit 28 through an OR circuit 27. Furthermore, the AND circuit 28 is connected to receive the outputs from the first and second coincidence detecting circuits 15 and 23, and the tab signal from a tab-key 31 via a NOT circuit 34.

The output from AND circuit 28 is applied to the respective reset terminals of first and second flip-flop circuits 29 and 30.

The first flip-flop circuit 29 is set by a tab-set command signal from the tab-key 31 and the output from flip-flop circuit 29 is impressed upon the shift register 11 as a shift signal through an AND circuit 32. The second flip-flop circuit 30 is set by the output from an AND circuit 21. The AND circuit 21 is driven by the outputs from the tab-set signal T, the "1" output from the flip-flop circuit 29, and the output from the second coincidence detecting circuit 23. The output from AND circuit 21 is applied to the set terminal of the second flip-flop circuit 30. The output from flip-flop circuit 30 is supplied to one input of AND circuit 32 via NOT circuit 33 and to one input of AND circuit 18.

The tabulation control system described above operates as follows: First, a tab-set data is applied to the shift register 11 from tab-set data input device 12. In a case where the tabulating book is provided with two types of the column as shown in FIG. 2, for example, the tab-set data comprises a tab-set position signal which is formed to correspond to a tab-set position representing a summed up position counted from a first position 0 in a range of from 0 to 60 in which it is possible to set the tab of the printing apparatus and in which are included tab-set positions $t_1$, $t_2$, $T_3$, $t_4$, and $t_5$. The tab-set position $t_1$ corresponds to a summed up position 10T, and tab-set positions $t_2$, $t_3$, $t_4$ and $t_5$ correspond to summed up positions 20T, 30T, 35T and 45T, respectively. By combining start code signal S and the mode switching signal C for columns A and B, data of the order of "S10T20T30TC35T45T" are stored in the shift register 11. Thus, the data from S to 30T correspond to tab-set signals for respective lines in column A, whereas the data from C to 45 corresond to tab-set signals for respective lines in column B.

Under these conditions, the output from counters 22 and 24 is still in a "0" state and the second flip-flop circuit 30 is also in the reset state so that there is no input to counter 16. Accordingly, its output is in a "0" state.

When tab-set key 31 is operated at this time, a tab-set signal is applied to the set terminal of the first flip-flop circuit 29 to set the same. As a result, the "1" output from the flip-flop circuit 29 is applied to AND gate circuit 32 together with the output "1" of NOT circuit 33 produced by the "0" output from the second flip-flop circuit 30, thus producing a shift signal by AND circuit 32 which functions to sequentially shift the data stored in the shift register 11. When the first code S of the data is applied to the code detector 13, the code detector 13 will apply a start signal to the reset terminal of counter 22. Consequently, the second coincidence detecting circuit 23 produces a coincidence output signal. The decimal data 10 following to code S is supplied to buffer register 14 from code detector 13 and written in the buffer register 14. A detection signal of the next code T is supplied to AND gate circuit 21 which, under this condition, is receiving the outputs from the coincidence detecting circuit 23 and flip-flop circuit 29 so that the AND gate circuit 21 is enabled to set flip-flop circuit 30. When set, flip-flop circuit 30 produces a "1" output which causes NOT circuit 33 to produce a "0" output with the result that the AND gate circuit 32 is disabled to stop the shifting operation of the shift register 11. The "1" output from the flip-flop circuit 30 is also applied to AND gate circuit 18 to enable the same to pass the output from the pulse generator 17 to counter 16 and the printing head feed mechanism 19 which is driven, for example, by a pulse motor, to feed the printing head in accordance with the count of the counter 16. Such a pulse motor type printing head feed mechanism, and means for detecting the starting position of the head, are described in detail in British Patent Specification No. 1,099,397. When the count value of the counter 16 reaches 10, the first coincidence detecting circuit 15 produces a coincidence output signal which is applied to AND gate circuit 28 together with the coincidence output signal from the second coincidence detecting circuit 23. At this time, because AND gate circuit 28 receives the outputs from the printing head position counter 16 and the buffer register 14 via OR gate 27 and the output from NOT circuit 34, the AND gate circuit 28 is enabled to reset both flip-flop circuits 29 and 30 by its output, thus selecting the first tab-set position $t_1$.

Thereafter, when the tab-set key 31 is operated again, the output of the NOT circuit 34 assumes a "0" state to disable AND gate circuit 28, thus setting flip-flop circuit 29. Accordingly, in the same manner as above described, a shift signal is applied to shift register 11 whereby the next value 20 from shift register 11 is written in the buffer register 14. Concurrently therewith, a "T" detection signal is produced by the code detector 13 to set flip-flop circuit 30. At this time, because there is no output from the first coincidence circuit 15, AND circuit 28 produces no reset output. Upon setting of the flip-flop circuit 30, the shift signal to the shift register 11 is interrupted and the AND circuit 18 is enabled to supply the pulse signal generated by pulse generator 17 to counter 16 and printing head feed mechanism 19. Counter 16 starts to count a previous count "10", and when its count reaches "20" it is applied with the output from the first coincidence detecting circuit 15 to reset flip-flop circuits 29 and 30 to select the second tab-set position $t_2$.

Under these conditions, when tab-key 31 is again operated, the printing head feed mechanism 19 is fed to position "30" by the same operation to select the third tab-set position $t_3$, thereby completing the tab-set of one unit line.

With a tabulation book of the form shown in FIG. 2, it is often necessary to repeat the operation of one unit line described above for several other lines. Thus, where it is desired to print the next line with the same tab-set, it is only necessary to operate carriage return key 20 to reset counter 16 by means of its RESET TERMINAL, and then to operate tab-key 31. Then, in the same manner as above described, flip-flop circuit 29 is set to shift the shift register 11. By this operation, code "C" is applied to code detector 13 to produce a detection signal C to cause counter 22 to count +1, thus interrupting the output from the second coincidence detecting circuit 23. Accordingly, the AND gate circuit 28 is disabled to interrupt the reset signal from flip-flop circuit 29 with the result that the shift register 11 is shifted continuously. The content of the shift register 11 is circulated through feedback path 10, and when a condition is reached at which the first code S enters into a code detector 13, then detector 13 produces a detection signal S so that counter 22 is cleared to produce an output from the second coincidence detecting circuit 23, thereby restoring the first condition. In other words, tab-set controls for 10T, 20T and 30T are repeated to print information on another line in column A of the tabulation book shown in FIG. 2.

When the printing of the information in column A is completed, and it is now desired to shift to column B, the mode switching key 25 is operated when the last tab-set operation of column A is finished. At the same time, the carriage return key 20 is also operated to cause counter 24 to count +1 and to clear counter 16.

The carriage return key 20 clears the counter 16 and also returns the printing head to the starting position. When the mode switching key operates concurrently with the carriage return key 20, the counter 24 is caused to count +1. In addition, any time the mode switching key 25 operates, including the concurrent operation with the carriage return key 20, the printing position is transferred from column A to column B, which columns are illustrated in FIG. 2.

Upon operation of the tab-key 31, the code detector 13 produces a detection signal C, thereby causing counter 22 to count +1. In this manner, a value "35" succeeding to code C is written in the buffer register 14. In response to a T detection signal corresponding to the next code T, flip-flop circuit 30 is set so as to shift the printing head to the position 35, thus completing the tab-set operation of position $t_4$ in the same manner as described above. The tab-set operation of position $t_5$ is performed in the same manner. After forming a tabulation book by a series of tab-set forms where it is desired to print another tabulation book or a slip with the same form, it is only necessary to operate clear key 26 to repeat the operations described above.

Although in the above embodiment only one mode switching code C and only two types of unit line were used, it will be clear that ordinary tabulation books require more mode switching. To this end, it is only necessary to interconnect the tab-set data to be written in the shift register 11 with a code "C". Each time the mode is switched, the count of the counter 22 is increased +1 and each time the mode switching key 25 is operated, the counter of counter 24 is also increased by +1.

It should be understood that, in the above described embodiment, the tab-set input may be provided by a program tape of a conventional electronic computer, for example, or may be manually written in. The printing of the information is done by the operation of a computer. The shift register may be of static or dynamic type. When a dynamic type register is used, a control circuit such as a buffer register may be added. Although in the foregoing embodiment only one tap position memory register 11 is provided, it should be understood that a plurality of such registers may be connected in parallel so as to enable selective use of any one of them. In the embodiment shown in FIG. 1, the mode was determined by applying the output from the mode switching key 25 to counter 24. It is also possible to preset mode designation information in counter 24.

Thus, the present invention provides a tabulation control system for printing apparatus wherein tab-set data of the desired unit lines are sequentially written in a shift register thereby enabling any desired tab-set control as well as the selection of a desired tab-set position. This enables simplification of the program control and the design of tabulation books and slips.

What is claimed is:

1. A tabulation control system for a printing apparatus, comprising in combination:
   a tab position memory register for continuously memorizing items of encoded decimal value information each representing a series of tab-set positions;
   means for generating pulse signals;
   printing head feed means operated by the pulse signals;
   a pulse counter for successively counting pulse signals supplied to said printing head feed means including means for detecting a starting position of a printing head after the printing head has reached the starting position;
   a tab command signal generator for reading from said tab position memory register the item of encoded decimal value information representing a next tab-set position distinct from the present tab-set position;
   means for shifting and controlling the content of said tab position memory register each time said tab command signal generator is operated; and
   a coincidence detector for detecting the coincidence of the item of encoded decimal value information representing the next tab-set position with the output from said pulse counter.

2. A tabulation control system for a printing apparatus, comprising in combination a tab position memory register for continuously memorizing a plurality of modes each successively storing items of encoded decimal value information, each mode representing a series of tab-set positions and each mode being linked to another with a stop code therebetween;
   means for generating pulse signals;
   printing head feed means operated by the pulse signals;
   a pulse counter for counting pulse signals supplied to said printing head feed means including means for detecting a starting position of a printing head after the printing head has reached the starting position, each of said pulse signals representing one printing position;
   a stop code detector for detecting the stop codes memorized in said tab position memory register;
   a mode designation command signal generator for designating one of the modes memorized in said tab position memory register;
   a mode designation counter actuated by said mode designation command signal generator;
   a mode command signal counter for counting the stop code detected by said stop code detector;
   a first coincidence detector for detecting the coincidence of the output from said mode designation signal counter with the output from said mode command signal counter;
   a tab command signal generator for reading from the mode designated by said first coincidence detector the item of decimal value information representing a next tab-set position;
   means for shifting and controlling the content of said tab position memory register each time said tab command signal generator is operated; and
   a second coincidence detector for detecting the coincidence of the item of decimal value information representing the next tab-set position with the output from said pulse counter thereby to control the operation of said printing head feed means.

* * * * *